United States Patent
Wendel et al.

(10) Patent No.: US 10,094,929 B2
(45) Date of Patent: Oct. 9, 2018

(54) METHOD FOR CARRIER-TO-NOISE RATIO ESTIMATION IN GNSS RECEIVERS

(71) Applicant: Astrium GmbH, Taufkirchen (DE)

(72) Inventors: Jan Wendel, Munich (DE); Frank Schubert, Munich (DE); Jean-Jacques Floch, Munich (DE); Francis Soualle, Munich (DE)

(73) Assignee: ASTRIUM GMBH, Taufkirchen (DE)

( * ) Notice: Subject to any disclaimer, the term of this patent is extended or adjusted under 35 U.S.C. 154(b) by 653 days.

(21) Appl. No.: 14/302,631

(22) Filed: Jun. 12, 2014

(65) Prior Publication Data

US 2014/0368383 A1 Dec. 18, 2014

(30) Foreign Application Priority Data

Jun. 13, 2013 (EP) .................................... 13290137

(51) Int. Cl.
| | |
|---|---|
| *G01S 19/21* | (2010.01) |
| *H04B 17/336* | (2015.01) |
| *G01S 19/11* | (2010.01) |
| *G01S 19/48* | (2010.01) |
| *H04B 17/345* | (2015.01) |

(Continued)

(52) U.S. Cl.
CPC ............. *G01S 19/21* (2013.01); *G01S 19/11* (2013.01); *G01S 19/48* (2013.01); *H04B 17/336* (2015.01); *H04B 17/345* (2015.01); *G01S 5/0263* (2013.01); *G01S 19/14* (2013.01); *G01S 19/215* (2013.01); *H04B 1/7085* (2013.01); *H04B 1/7097* (2013.01); *H04B 17/364* (2015.01);

(Continued)

(58) Field of Classification Search
CPC .......... G01S 19/21; G01S 19/11; G01S 19/48; G01S 19/215; G01S 19/14; H04B 17/345; H04B 17/336
USPC .......................... 342/357.59, 357.52, 357.68
See application file for complete search history.

(56) References Cited

U.S. PATENT DOCUMENTS

| | | | | |
|---|---|---|---|---|
| 6,816,539 | B1 * | 11/2004 | Rog ........................ | G01S 19/21 |
| | | | | 342/357.59 |
| 7,362,795 | B1 * | 4/2008 | Lennen ................... | G01S 19/29 |
| | | | | 342/357.68 |

(Continued)

FOREIGN PATENT DOCUMENTS

WO WO2010/102331 A1 9/2010

OTHER PUBLICATIONS

European Search Report dated Oct. 28, 2013 (seven (7) pages).

(Continued)

*Primary Examiner* — Chuong P Nguyen
(74) *Attorney, Agent, or Firm* — Crowell & Moring LLP

(57) ABSTRACT

A method for determining an indicator of an amount of noise comprised within a received signal within a satellite communication network or a GNSS involves extracting a received modulating signal from the received signal. An estimate of the transmission delay is determined based on the in-phase component of the modulating signal. A prompt replica of the modulating signal is generated using the estimate of the transmission delay. A prompt quadrature correlation of the quadrature component of the received modulating signal and of the quadrature component of the prompt replica is determined, and the indicator of the amount of noise comprised within the received signal is determined based on the prompt quadrature correlation.

15 Claims, 5 Drawing Sheets

(51) Int. Cl.
*G01S 19/14* (2010.01)
*H04B 1/7097* (2011.01)
*H04L 1/20* (2006.01)
*H04L 27/22* (2006.01)
*H04L 27/38* (2006.01)
*G01S 5/02* (2010.01)
*H04W 56/00* (2009.01)
*H04B 17/364* (2015.01)
*H04B 1/7085* (2011.01)

(52) U.S. Cl.
CPC .............. *H04L 1/206* (2013.01); *H04L 27/22* (2013.01); *H04L 27/38* (2013.01); *H04W 56/00* (2013.01)

(56) References Cited

U.S. PATENT DOCUMENTS

| | | | |
|---|---|---|---|
| 7,414,581 B2* | 8/2008 | Vallot | G01R 29/26 342/357.62 |
| 7,613,258 B2* | 11/2009 | Yu | H04B 1/7097 342/357.68 |
| 7,912,111 B2* | 3/2011 | Cartmell | H03J 7/04 375/137 |
| 7,995,683 B2* | 8/2011 | Yuan | G01S 19/30 375/343 |
| 8,054,872 B2* | 11/2011 | Hou | G01S 19/21 370/252 |
| 8,368,593 B2* | 2/2013 | Zhodzishsky | G01S 19/23 342/357.68 |
| 9,425,908 B1* | 8/2016 | Vazhenin | H04B 17/20 |
| 9,503,219 B2* | 11/2016 | Vazhenin | H04L 1/0063 |
| 2005/0281358 A1* | 12/2005 | Bottomley | H04B 1/712 375/343 |
| 2007/0053452 A1* | 3/2007 | Koo | H04L 27/2613 375/260 |
| 2012/0326926 A1* | 12/2012 | Vander Velde | G01S 19/243 342/357.68 |

OTHER PUBLICATIONS

Mohammad S. Sharawi et al., "GPS C/ No Estimation in the Presence of Interference and Limited Quantization Levels", IEEE Transactions on Aerospace and Electronic Systems, vol. 43, No. 1, Jan. 1, 2007, pp. 227-238, XP011180928.

A.K.M. Najmul Islam et al., "Moment Based CNR Estimators for BOC/BPSK Modulated Signal for Galileo/GPS", Proceedings of the 5th Workshop on Positioning, Navigation and Communication, Mar. 27, 2008, pp. 129-136, XP031247839.

* cited by examiner

METHOD FOR CARRIER-TO-NOISE RATIO ESTIMATION IN GNSS RECEIVERS

CROSS-REFERENCE TO RELATED APPLICATIONS

The present application claims priority to European Patent Application No. 13 290 137.2-1860, filed Jun. 13, 2013, the entire disclosure of which is herein expressly incorporated by reference.

BACKGROUND OF THE INVENTION

The present invention relates to the reception of Binary Phase Shift Keying (BPSK) signals, as well as subcarrier modulated signals, such as Binary Offset Carrier (BOC) modulated signals, but not limited thereto. In particular, the present document relates to the determination of a Carrier-to-Noise ratio (or a Signal-to-Noise Ratio) of signals in a Global Navigation Satellite System (GNSS).

In next generation GNSS systems, binary offset carrier (BOC) modulation and multiplexed binary offset carrier (MBOC) modulation will be used. Examples for such BOC or MBOC modulated signals are the Galileo E1 open signal, a CBOCc(6,1,1/11) signal (i.e. a composite BOC signal using a cosine subcarrier), the Galileo PRS (Public Regulated Service) signals on E1 and E6, a BOCc(15,2.5) signal and a BOCc(10,5) signal, respectively, and the GPS M-code, which corresponds to a BOC(10,5) signal. In more general terms, the above mentioned signals may be referred to as subcarrier modulated signals. Such subcarrier modulated signals comprise a carrier signal, which is modulated with a pseudo random noise (PRN) code, and which is additionally modulated with one or more subcarriers. Additionally, navigation message data may or may not be modulated onto the carrier signal.

A BOC modulated signal without subcarrier modulation corresponds to a BPSK (Binary Phase Shift Keying) signal used for GPS SPS (Standard Positioning System), which exhibits a triangular autocorrelation function. FIG. 1a shows an example subcarrier signal 101, 102 having a subcarrier symbol duration $$T_s = \frac{1}{2f_s},$$

wherein $f_s$ is the subcarrier rate. FIG. 1a also illustrates the symbol duration $$T_c = \frac{1}{f_c}$$

of a symbol of the PKN code (wherein $f_c$ is the code rate), yet the PRN code signal itself is not shown in this figure. In the illustrated example, the subcarrier rate $f_s$ is twice as high as the code rate $f_c$ and the resulting BOC signal is referred to as a BOC(2m,m) signal (based on the notation BOC(m,n) where the respective frequencies are given by $f_s$=m·1.023 MHz, $f_c$=n·1.023 MHz). The code rate $f_c$ may also be referred to as the chip rate and a symbol of the PRN code (having a code symbol duration $T_c$) may be referred to as a chip. The subcarrier 101, 102 itself has a saw-tooth like autocorrelation function 103 as shown in FIG. 1a. The autocorrelation function 113 of a BOC signal is approximately given by the multiplication of a triangular PRN-code autocorrelation function 123 with the subcarrier autocorrelation function 103. Therefore, this autocorrelation function 113 has multiple peaks as shown in FIG. 1b.

A receiver in a GNSS typically receives signals from a plurality of different satellites, i.e. via a plurality of different channels. Typically, a pre-determined number of received channels (e.g. three channels) are used to determine the position of the GNSS receiver. If more than the pre-determined number of received channels is received, the receiver may be configured to select a subset of the received channels. The precision of the determined position of the receiver may be increased by selecting those channels having the relatively highest Carrier-to-Noise Ratio (C/N$_0$) and/or the relatively highest Signal-to-Noise Ratio (SNR) among the received channels. Hence, it is desirable to provide a scheme for reliably and precisely estimating the C/N$_0$ and/or the SNR of a received channel within a GNSS.

Exemplary embodiments of the present invention are directed to schemes for reliably and precisely estimating the C/N$_0$ and/or the SNR of satellite signals, which schemes are particularly beneficial for the estimation of C/N$_0$ and/or SNR values, which exceed a pre-determined threshold (e.g. 50 dbHz).

SUMMARY OF THE INVENTION

According to an aspect, a method for determining an indicator of an amount of noise comprised within a received signal is described. The received signal may have been transmitted over a satellite communication network or in the context of a Global Navigation Satellite System, although the present disclosure is not limited to satellite communication. In particular, the received signal may have been transmitted by a satellite and may be received at a receiver (e.g. a GNSS receiver) within a base station. As such, the received signal may be a satellite signal transmitted from an orbiting satellite. The received signal typically has incurred a transmission delay due to the transmission from the transmitter to the receiver.

The received signal may be indicative of a carrier signal modulated with a modulating signal. In general, the modulating signal may comprise an in-phase component and possibly a quadrature component. The modulating signal may be used to modulate a phase of the carrier signal. In an example, the modulating signal only comprises an in-phase component, with the quadrature component being zero. By way of example, the modulating signal may comprise a BPSK signal and/or a binary offset carrier (BOC) signal.

The method may comprise extracting a received modulating signal from the received signal. Extracting the received modulating signal from the received signal may comprise estimating a phase and/or a frequency of the carrier signal. In particular, the phase and/or frequency of the carrier signal may be tracked. In other words, the receiver of the received signal may be locked to the phase of the carrier signal, to provide access to the received modulating signal. The received modulating signal typically corresponds to the modulating signal and additional noise. Consequently, in general, the received modulating signal comprises an in-phase component and a quadrature component.

The method may further comprise determining an estimate of the transmission delay based on the in-phase component of the modulating signal. The estimate of the transmission delay may be determined without using the quadrature component of the modulating signal. In particular, the modulating signal may be designed such that the relevant information for determining the estimate of the transmission delay is only comprised within the in-phase component of the modulating signal (and is not comprised with the quadrature component of the modulating signal). As disclosed herein, the in-phase component may be understood as the component based on which the transmission delay is determined, regardless which definition of in-phase and quadrature component is used in the corresponding GNSS signal-in-space (SIS) definitions. It should be noted that the received signal may comprise information within the quadrature component. However, the receiver may be configured to ignore the information comprised within the quadrature component when determining the estimate of the transmission delay. As such, the receiver may be configured to extract information from the in-phase component of the modulating signal for estimating the transmission delay of the satellite signal. The information comprised within the quadrature component of the modulation signal may be regarded by the receiver as being noise.

The method may comprise generating a prompt replica of the modulating signal using the estimate of the transmission delay. For this purpose, the modulating signal may be delayed in accordance to the estimate of the transmission delay. Furthermore, the method may comprise determining a correlation, referred to as a prompt quadrature correlation, of the quadrature component of the received modulating signal and of the quadrature component of the prompt replica. Determining a correlation of a component (e.g. the quadrature component) of the received modulating signal and a component (e.g. the quadrature component) of a replica of the modulating signal comprises multiplying corresponding samples of the component of the received modulating signal and of the component of the replica. The multiplied samples may be averaged over a pre-determined number of epochs to yield a correlation value.

The method may further comprise determining the indicator of the amount of noise comprised within the received signal based on the prompt quadrature correlation. In particular, the indicator may be determined based on the squared prompt quadrature correlation. The squared prompt quadrature correlation may be determined at a plurality of different epochs (or time instants or samples), to yield a sequence of squared prompt quadrature correlations. The indicator may be determined based on the sequence of squared prompt quadrature correlations, e.g. based on a sequence of N squared prompt quadrature correlations, with N being an integer greater than one (e.g. N greater or equal to 10, or N greater or equal to 100).

The method may further comprise determining a correlation, referred to as a prompt in-phase correlation, of the in-phase component of the received modulating signal and of the in-phase component of the prompt replica. The indicator of the amount of noise comprised within the received signal may be determined based on a ratio of a value derived from the prompt in-phase correlation and a value derived from the prompt quadrature correlation. In particular, a sequence of ratios of corresponding squared prompt quadrature correlations and squared prompt in-phase correlations may be determined at a sequence of different epochs. The indicator may be determined based on the sequence of ratios, e.g. based on a sequence of N ratios. In particular, the indicator may be determined based on the sum of the sequence of ratios. Even more particularly, the indicator may be determined based on an average of the ratios within the sequence of N ratios.

Let $I_P$ denote the prompt in-phase correlation and $Q_P$ denote the prompt quadrature correlation. A first signal-to-noise ratio (SNR) may be determined as $$SNR = \left[ \frac{1}{N} \sum_{k=1}^{N} \frac{2 \cdot Q_{P,k}^2}{I_{P,k}^2} \right]^{-1}$$

with k identifying a sample of the prompt in-phase and quadrature correlations and with N being an integer greater than one. The indicator of the amount of noise comprised within the received signal may be determined based on the first signal-to-noise ratio or a scaled value thereof. In particular, the indicator of the amount of noise comprised within the received signal may be a carrier-to-noise ratio, and the carrier-to-noise ratio (e.g. $C/N_0$ value) may be determined by multiplying the first signal-to-noise ratio with an equivalent noise bandwidth.

Alternatively or in addition, the method may comprise generating an early replica of the modulating signal using the estimate of the transmission delay and using an early gate time offset. In particular, the modulating signal may be delayed in accordance to the estimate of the transmission delay and advanced in accordance to the early gate time offset. A correlation, referred to as an early in-phase correlation, of the in-phase component of the received modulating signal and the in-phase component of the early replica may be determined.

Furthermore, the method may comprise generating a late replica of the modulating signal using the estimate of the transmission delay and using a late gate time offset. In particular, the modulating signal may be delayed in accordance to the estimate of the transmission delay and further delayed in accordance to the late gate time offset. The early gate time offset and the late gate time offset may be equal. A correlation, referred to as a late in-phase correlation, of the in-phase component of the received modulating signal and the in-phase component of the late replica may be determined.

The indicator of the amount of noise comprised within the received signal may be determined based on a difference of the early in-phase correlation and the late in-phase correlation. In particular, the indicator may be determined based on the difference of the early in-phase correlation and the late in-phase correlation, if an expected SNR and/or carrier-to-noise ratio exceeds a pre-determined threshold. If the expected SNR and/or carrier-to-noise ratio does not exceed the pre-determined threshold, the indicator of the amount of noise comprised within the received signal may be determined based on the prompt quadrature correlation (as outlined above).

The method may further comprise determining a mean value of the squared difference of the early in-phase correlation and the late in-phase correlation. The indicator of the amount of noise comprised within the received signal may then be determined based on the squared difference of the early in-phase correlation and the late in-phase correlation, normalized by the mean value of the squared difference of the early in-phase correlation and the late in-phase correlation.

Furthermore, the method may comprise determining a second signal-to-noise ratio based on a ratio of the squared difference of the early in-phase correlation and the late in-phase correlation, normalized by the mean value of the squared difference of the early in-phase correlation and the late in-phase correlation, and of the squared prompt in-phase correlation. In particular, the indicator of the amount of noise comprised within the received signal may be determined based on the second signal-to-noise ratio. By way of example, the indicator may be determined using the formula (3) provided in the present application.

The method may comprise determining a mean value of the prompt in-phase correlation. The indicator of the amount of noise comprised within the received signal may be determined based on a difference of the prompt in-phase correlation and the mean value of the prompt in-phase correlation. In particular, the method may comprise determining a third signal-to-noise ratio based on a ratio of the squared difference of the prompt in-phase correlation and the mean value of the prompt in-phase correlation, and of the squared prompt in-phase correlation. The indicator of the amount of noise comprised within the received signal may be determined based on the third signal-to-noise ratio. By way of example, the indicator may be determined using the formula (4) provided in the present document.

The method may comprise generating an offset replica of the modulating signal using the estimate of the transmission delay and using a decorrelating time offset. The offset replica may be generated by delaying the modulating signal in accordance to the estimate of the transmission delay and by further delaying or by advancing the modulating signal in accordance to the decorrelating time offset. The decorrelating time offset may be such that an autocorrelation value of the modulating signal for a lag corresponding to the decorrelating time offset is below a pre-determined autocorrelation threshold. Alternatively or in addition, the modulating signal is indicative of a code signal (e.g. a pseudo random code) and the code signal has a pre-determined symbol duration $T_c$. The decorrelating time offset may be equal to or greater than the pre-determined symbol duration $T_c$.

The method may comprise determining a correlation, referred to as an offset in-phase correlation, of the in-phase component of the received modulating signal and the in-phase component of the offset replica. The indicator of the amount of noise comprised within the received signal may be determined based on the offset in-phase correlation. By way of example, the indicator may be determined using the formula (5) provided in the present document.

According to a further aspect, a receiver, e.g. for a satellite communication network, is described. The receiver may be configured to receive a signal, referred to as the received signal. The received signal may be indicative of a carrier signal modulated with a modulating signal. The modulating signal may comprise an in-phase component and a quadrature component. The receiver may be configured to extract a received modulating signal from the received signal and to determine an estimate of the transmission delay based on the in-phase component of the modulating signal. Furthermore, the receiver may be configured to generate a prompt replica of the modulating signal using the estimate of the transmission delay and to determine a correlation, referred to as a prompt quadrature correlation, of the quadrature component of the received modulating signal and of the quadrature component of the prompt replica. In addition, the receiver may be configured to determine an indicator of the amount of noise comprised within the received signal based on the prompt quadrature correlation.

According to another aspect, a method (and a corresponding receiver) for determining an indicator of an amount of noise comprised within a received signal is described. The received signal may be indicative of a carrier signal modulated with a modulating signal and may have incurred a transmission delay. The modulating signal may comprise an in-phase component and a quadrature component. The method may comprise extracting a received modulating signal from the received signal and determining an estimate of the transmission delay based on the received modulating signal.

Furthermore, the method may comprise generating an early replica of the modulating signal using the estimate of the transmission delay and using an early gate time offset. In particular, the modulating signal may be delayed in accordance to the estimate of the transmission delay and advanced in accordance to the early gate time offset. A correlation, referred to as an early in-phase correlation, of the in-phase component of the received modulating signal and the in-phase component of the early replica may be determined.

Furthermore, the method may comprise generating a late replica of the modulating signal using the estimate of the transmission delay and using a late gate time offset. In particular, the modulating signal may be delayed in accordance to the estimate of the transmission delay and further delayed in accordance to the late gate time offset. The early gate time offset and the late gate time offset may be equal. A correlation, referred to as a late in-phase correlation, of the in-phase component of the received modulating signal and the in-phase component of the late replica may be determined.

The indicator of the amount of noise comprised within the received signal may be determined based on a difference of the early in-phase correlation and the late in-phase correlation.

The latter method for determining an indicator of the amount of noise may be used standalone or in conjunction with the other methods for determining an indicator of the amount of noise, which are described in the present document. Furthermore, the latter method for determining an indicator of the amount of noise may comprise any one or more of the features described in the present document.

According to another aspect, a method (and a corresponding receiver) for determining an indicator of an amount of noise comprised within a received signal is described. The received signal may be indicative of a carrier signal modulated with a modulating signal and may have incurred a transmission delay. The modulating signal may comprise an in-phase component and a quadrature component. The method may comprise extracting a received modulating signal from the received signal and determining an estimate of the transmission delay based on the received modulating signal.

Furthermore, the method may comprise generating a prompt replica of the modulating signal using the estimate of the transmission delay. For this purpose, the modulating signal may be delayed in accordance to the estimate of the transmission delay. Furthermore, the method may comprise determining a correlation, referred to as a prompt quadrature correlation, of the quadrature component of the received modulating signal and of the quadrature component of the prompt replica.

The method may comprise determining a mean value of the prompt in-phase correlation. The indicator of the amount of noise comprised within the received signal may be determined based on a difference of the prompt in-phase correlation and the mean value of the prompt in-phase correlation.

The latter method for determining an indicator of the amount of noise may be used standalone or in conjunction with the other methods for determining an indicator of the amount of noise, which are described in the present document. Furthermore, the latter method for determining an indicator of the amount of noise may comprise any one or more of the features described in the present document.

According to a further aspect, a method (and a corresponding receiver) for determining an indicator of an amount of noise comprised within a received signal is described. The received signal may be indicative of a carrier signal modulated with a modulating signal and may have incurred a transmission delay. The modulating signal may comprise an in-phase component and a quadrature component. The method may comprise extracting a received modulating signal from the received signal and determining an estimate of the transmission delay based on the received modulating signal.

Furthermore, the method may comprise generating an offset replica of the modulating signal using the estimate of the transmission delay and using a decorrelating time offset. The offset replica may be generated by delaying the modulating signal in accordance to the estimate of the transmission delay and by further delaying or by advancing the modulating signal in accordance to the decorrelating time offset. The decorrelating time offset may be such that an autocorrelation value of the modulating signal for a lag corresponding to the decorrelating time offset is below a pre-determined autocorrelation threshold. Alternatively or in addition, the modulating signal is indicative of a code signal (e.g. a pseudo random code) and the code signal has a pre-determined symbol duration $T_c$. The decorrelating time offset may be equal to or greater than the pre-determined symbol duration $T_c$.

The method may comprise determining a correlation, referred to as an offset in-phase correlation, of the in-phase component of the received modulating signal and the in-phase component of the offset replica. The indicator of the amount of noise comprised within the received signal may be determined based on the offset in-phase correlation.

The latter method for determining an indicator of the amount of noise may be used standalone or in conjunction with the other methods for determining an indicator of the amount of noise, which are described in the present document. Furthermore, the latter method for determining an indicator of the amount of noise may comprise any one or more of the features described in the present document.

According to a further aspect, a software program is described. The software program is adapted for execution on a processor and for performing the method steps outlined in the present document when carried out on the processor.

According to another aspect, a storage medium is described. The storage medium comprises a software program adapted for execution on a processor and for performing the method steps outlined in the present document when carried out on the processor.

According to a further aspect, a computer program product is described. The computer program comprises executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be combined in many different ways. In particular, the features of the claims may be combined with one another in an arbitrary manner.

BRIEF DESCRIPTION OF THE DRAWING FIGURES

The invention is explained below in an exemplary manner with reference to the accompanying drawings, wherein FIG. 1a shows an autocorrelation function of an example subcarrier used for modulating a carrier signal;

DETAILED DESCRIPTION

Figure 1A:
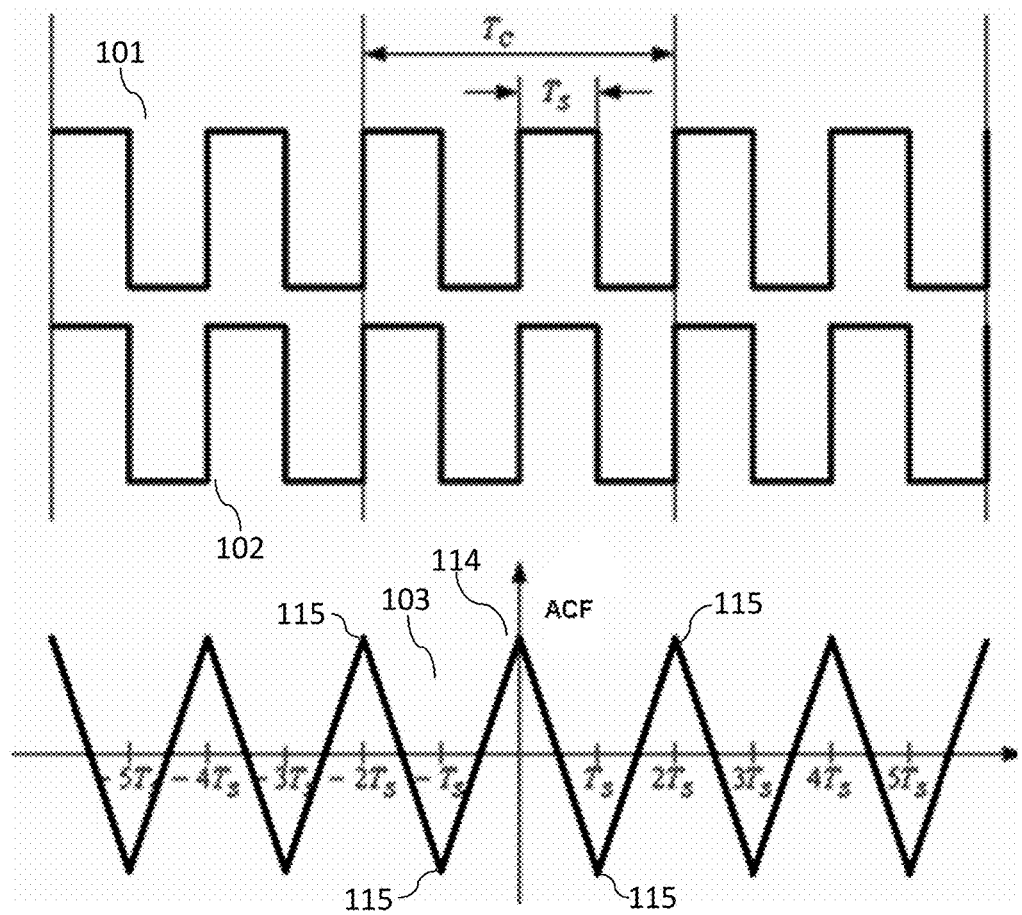
FIG. 1b shows an autocorrelation function of an example subcarrier modulated signal.
FIG. 1c shows an envelope of an autocorrelation function of an example subcarrier modulated signal, including prompt, early and late gates; the illustrated autocorrelation function is similar to the autocorrelation function of the corresponding BPSK signal.

As outlined above, exemplary embodiments of the present invention relate to the estimation of the $C/N_0$ of a received satellite signal. By way of example, in a GNSS receiver, the $C/N_0$ may be an important indicator for the quality of the signal under track. Therefore, this quantity (i.e. the $C/N_0$) is estimated by many of the GNSS receivers and communicated to the user, in order to provide the user with an indication for the amount of jitter corrupting pseudo-range, delta-range, and carrier phase measurements. Furthermore, the $C/N_0$ may provide an indication on the likelihood for cycle slips and for loosing lock to the received satellite signal. Furthermore, the $C/N_0$ values for different received satellite signals may be used to select an appropriate subset of received satellite signals for the determination of the position of the GNSS receiver.

A variety of algorithms for estimating the $C/N_0$ have been proposed. Except for the Narrowband-Wideband Power Method (NWPR) which estimates the $C/N_0$ directly, the proposed methods estimate the signal-to-noise ratio (SNR), and calculate the corresponding $C/N_0$ as follows:

$$C/N_0 = SNR \cdot B_{eqn},$$

where SNR is the signal-to-noise ratio and where $B_{eqn}$ is the equivalent noise bandwidth. These $C/N_0$ algorithms typically do not work satisfyingly for $C/N_0$ values above 50 dBHz. However, $C/N_0$ values in excess of 50 dBHz may readily occur when tracking GNSS satellite signals, notably when using patch antennas or, in more general terms, antennas with a sufficient directivity. Furthermore, even if a $C/N_0$ algorithm provides a reliable stationary behavior, outliers may occur in the $C/N_0$ estimates when the true $C/N_0$ changes abruptly. Such an abrupt change may occur due to various reasons: by way of example, the GNSS satellite signal may be damped (e.g. by foliage or some other blocking object), or the noise level may be increased e.g. by jamming, which may then be compensated by the adaptive gain control (AGC) of the receiver.

In view of the above, it is desirable to provide a method for reliably and precisely estimating the $C/N_0$ in stationary and disruptive C/N₀ situations. The present document describes methods for SNR and/or C/N₀ estimation (which may be used e.g. in a GNSS receiver). The described methods provide accurate estimates also at C/N₀ values in excess of a predetermined threshold (e.g. 50 dBHz). Furthermore, the described methods do not show outliers in situations where the true C/N₀ changes abruptly.

As outlined above, a satellite signal typically comprises a carrier signal that is modulated with a modulating signal. The modulating signal may e.g. comprise a pseudo random noise (PRN) code, which may be additionally modulated with one or more subcarriers. The receiver may be configured to extract the (received) modulating signal from the received satellite signal by removing the carrier signal (e.g. by transposing the received satellite signal into the baseband or into an intermediate frequency band).

The received modulating signal may be represented as a complex signal comprising an in-phase component $X_k$ and a quadrature component $Y_k$ at the epoch (or time instant or sample) k. A possible scheme for determining the SNR of a received QPSK signal may be based on the following formula $$SNR = \left[ \frac{1}{N} \sum_{k=1}^{N} \frac{(|X_k| - |Y_k|)^2}{X_k^2 + Y_k^2} \right]^{-1}. \quad (1)$$

The in-phase and quadrature components $X_k, Y_k$ of the total received modulating signal at epoch k typically comprises the in-phase and quadrature modulating signal components, $R_{x,k}$, $R_{y,k}$, and the in-phase and quadrature noise components, $n_{x,k}$, $n_{y,k}$, as follows: $X_k = R_{x,k} + n_{x,k}$ and $Y_k = R_{y,k} + n_{y,k}$. The number of received signal samples, over which the summation for determining the SNR is performed, is denoted with N (typically N>1, e.g. N equal to or greater than 100).

In a GNSS receiver, modulated signals, e.g. BPSK, BOC, or BOCcos signals, may be tracked. The tracking system of a GNSS receiver may employ different feedback loops. A first loop may be used for carrier tracking, i.e. for the locking to the phase and/or frequency of the carrier signal comprised within the received satellite signal. The first loop may make use of PLL (phase lock loop) and/or FLL (frequency lock loop) techniques. As a result of the first loop, a carrier phase and/or carrier frequency compensated received modulated signal (also referred to as the received modulating signal) may be derived from the received modulated signal. In this context, the first loop may be configured to determine a correlation between the received signal and a replica (e.g. a prompt replica) of the modulating signal.

Furthermore, the tracking system may make use of a second loop which may be used for code tracking, additional correlators may be used in case of a subcarrier modulated signal for determining the peak 115 of the autocorrelation function 103 to which the second loop is locked. By doing this, an estimate $\hat{\tau}$ of the transmission delay $\tau$ of the received modulated signal may be determined. The second loop of the tracking system may comprise an Early-Late discrimination unit. In this context, the second loop may be configured to determine a correlation between the received modulating signal and a replica (e.g. an early replica and/or a late replica) of the modulating signal.

The received signal u(t) at the GNSS receiver may be denoted as $$u(t) = \exp(j\omega t + \varphi) \times s(t-\tau) \times a(t-\tau)$$

wherein $\omega$ is the intermediate (or baseband) frequency, $\varphi$ is the unknown phase of the carrier signal, $s(t-\tau)$ is the subcarrier signal 101 delayed by the transmission delay $\tau$ and $a(t-\tau)$ is the code (also referred to as the code signal) delayed by the transmission delay $\tau$. In case of a BPSK signal, no subcarrier signal is present. The tracking system may be configured to track the transmission delay $\tau$, i.e. to determine an estimate $\hat{\tau}$ of the transmission delay $\tau$, e.g. using the above mentioned feedback loops. As indicated above, the first loop may be used to compensate the carrier frequency $\omega$ and the carrier phase $\varphi$, to yield a carrier frequency and/or carrier phase compensated received signal (i.e. the received modulating signal)

$$v(t) = s(t-\tau) \times a(t-\tau).$$

Figure 1B:
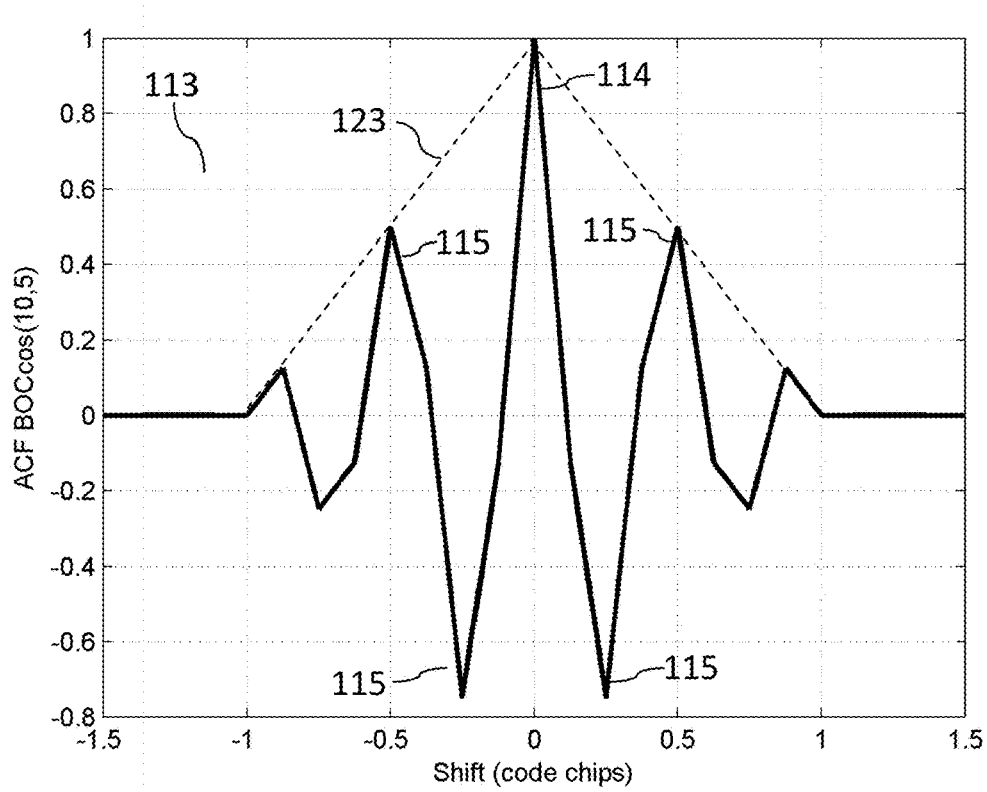

The signal v(t) may exhibit the autocorrelation function 113 shown in FIG. 1b.

The tracking system may be configured to determine a prompt correlation of the received modulating signal $v_k$ by correlating the received modulating signal $v_k$ with a prompt replica (also referred to as a PP replica) $(t-\hat{\tau}) \times a(t-\hat{\tau})$ of the modulating signal. The prompt correlation results (after the integrate & dump functionality), are usually denoted as $I_P$ and $Q_P$.

When tracking the GNSS received satellite signal in phase-lock, the quadrature channel (also referred to as quadrature component) $Q_P$ typically only contains noise. In other words, if the first loop of the tracking system is correctly locked to the phase of the carrier signal, the quadrature component $Q_P$ may be regarded by the tracking system as being noise. This is even the case, when an additional signal is present in the quadrature component, because this additional signal component is typically not lifted above the noise floor by correlation with an appropriate replica of the modulating signal. In other words, the tracking system of a GNSS receiver typically ignores the quadrature component of the received modulating signal, and as a consequence, the quadrature component may be regarded as being noise.

For example, using a conventional tracking loop for tracking the GPS C/A code signal on L1, the GPS P(Y) signal is present in the quadrature channel, but buried below the noise floor as it does not correlate with the C/A code replica. Hence, when tracking a BPSK, BOC, or BOCcos signal component at a GNSS receiver, the following prompt correlation results (i.e. the results of the correlation of the received signal or the received modulating signal with a prompt replica) may be available after performing integrate & dump: the prompt in-phase correlation component $I_{P,k} = R_{x,k} + n_{x,k}$ (which comprises a signal component and a noise component), and the prompt quadrature component $Q_{P,k} = n_{y,k}$ (which may be regarded as being noise).

As possible adaption of the above mentioned QPSK SNR estimator (according to formula (1) for BOC, MBOC, CBOC and BPSK signals may be as follows:

1. The noise energy term $(|X_k| - |Y_k|)^2$ of formula (1) may be replaced with the term $(|I_{P,k}| - |I_{P,k-1}|)^2$, with the reasoning that for consecutive IQ samples, the correlation results do not change significantly and therefore cancel in the difference. The noise contributions to consecutive IQ data samples are uncorrelated and by consequence the difference of the uncorrelated noise samples dominates the new noise energy term, which therefore has the same expectation as the original noise energy term.
2. The signal energy term $X_k^2 + Y_k^2$ of formula (1) may be replaced with the new signal energy term $\frac{1}{2}(I_{P,k}^2 +$ $I_{P,k-1}{}^2$), with the reasoning that both $I_{P,k}{}^2$ and $I_{P,k-1}{}^2$ are dominated by the signal power. Therefore, the sum of $I_{P,k}{}^2$ and $I_{P,k-1}{}^2$ should be twice the signal power, which explains the multiplication by ½ to achieve the correct signal power.

By replacing the noise energy term and the signal energy term of formula (1) in the above mentioned manner, a modified SNR estimator (referred to as the BL estimator) is obtained. The BL estimator makes use of time differences of consecutive IQ data samples. The use of time differences of consecutive IQ data samples has a drawback, if the true $C/N_0$ value and therefore the amplitude of the correlation result after integrate & dump changes abruptly. In other words, the above mentioned SNR estimator has drawbacks subject to abrupt $C/N_0$ value changes.

The following SNR estimator (referred to as the BL BPSK estimator) avoids the use of IQ sample differences, and provides reliable estimates, even subject to abrupt $C/N_0$ value changes. In the proposed SNR estimator, 1. The noise energy term $(|X_k|-|Y_k|)^2$ of formula (1) is replaced with the modified noise energy term $2 \cdot Q_{P,k}{}^2$. The modified noise energy term is motivated by the fact that in case of the tracking of e.g. a BPSK signal in phase-lock, the quadrature component may be regarded as containing noise only. The noise energy comprised within the quadrature component is typically half of the total noise energy comprised within the in-phase and quadrature component.
2. The signal energy term $X_k{}^2+Y_k{}^2$ may be replaced with the modified signal energy term $I_{P,k}{}^2$, with the reasoning that $I_{P,k}{}^2$ is dominated by the signal power.

Therefore, a reliable SNR estimator may be given by the formula:

$$SNR = \left[ \frac{1}{N} \sum_{k=1}^{N} \frac{2 \cdot Q_{P,k}^2}{I_{P,k}^2} \right]^{-1}. \quad (2)$$

This SNR estimator is in particular applicable to BPSK based modulated signals, which do not comprise a signal component within the quadrature component.

Figure 2:
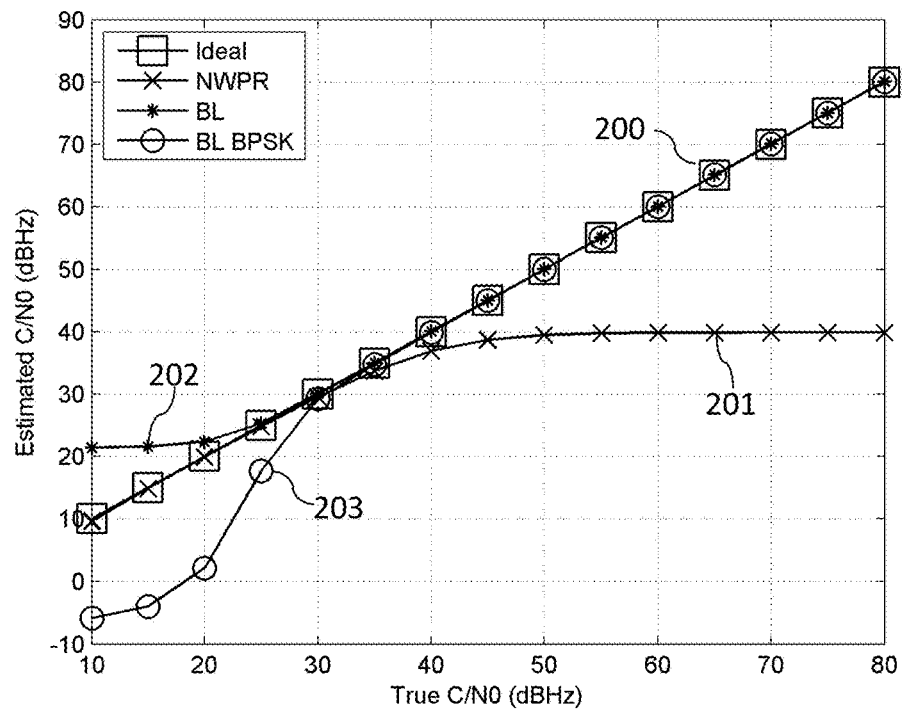
FIG. 2 shows example simulation results of different $C/N_0$ estimation methods.

FIG. 2 shows example static performance results for various different $C/N_0$ estimators. The $C/N_0$ estimator which uses the Narrowband-Wideband Power Ratio method (denoted with NWPR) typically provides accurate estimates 201 for relatively low $C/N_0$ values. On the other hand, the NWPR based estimator shows significant deviations from the true $C/N_0$ values 200 in case of relatively high $C/N_0$ values. The $C/N_0$ estimator which uses the above described BL estimator provides reliable (static) estimates 202 for relatively high $C/N_0$ values. In a similar manner, the $C/N_0$ estimator that uses the above described BL BPSK estimator provides reliable estimates 203 for relatively high $C/N_0$ values. In the performance results of FIG. 2, effects during the transition from one C/N0 value to another C/N0 value have been blanked out, i.e. what is shown in FIG. 2 are the mean estimator outputs after convergence to a new C/N0 value. For each algorithm, N=100 IQ data samples were considered for each SNR estimate, the pre-detection integration time was set to 10 ms. The pre-detection integration time typically refers to the time interval, for which the baseband samples after multiplication with the replicas are summed in order to provide a correlation result.

As can be seen in FIG. 2, the BL estimator and the BL BPSK estimator (according to formula (2)) provide accurate results for $C/N_0$ values of 30 dBHz and above. Below 30 dBHz, the proposed BL BPSK estimator under-estimates the true $C/N_0$ value 200. However, the relationship between the estimated $C/N_0$ value 203 and the true $C/N_0$ value 200 is bijective (notably below 30 dBHz), i.e. a one-to-one relationship between the estimated $C/N_0$ value 203 and the true $C/N_0$ value 200 is provided. Therefore, a nonlinear mapping may be defined for the estimated C/N0 values 203 (e.g. for values below 30 dBHz), wherein the nonlinear mapping corrects for the deviation between the estimated $C/N_0$ value 203 and the true $C/N_0$ value 200, thereby extending the area of applicability of this estimator to C/N0 values below 30 dBHz.

In the considered scenario of FIG. 2, the Narrowband-Wideband Power Ratio method provides accurate estimates 201 below 35 dBHz only. Above 50 dBHz, a fixed $C/N_0$ value of 40 dBHz is estimated, regardless of the true $C/N_0$. Therefore, the range of applicability of the NWPR method may not be extended to higher $C/N_0$ by defining a nonlinear mapping function, as the relationship between the true and estimated $C/N_0$ values is not a bijective function. A possible option to extend the applicability of the NWPR method to higher $C/N_0$ values is to increase the number N of IQ data samples used in the respective summations, which, however, would increase the required convergence time to a new $C/N_0$ value, subject to a changed $C/N_0$ value.

Figure 3:
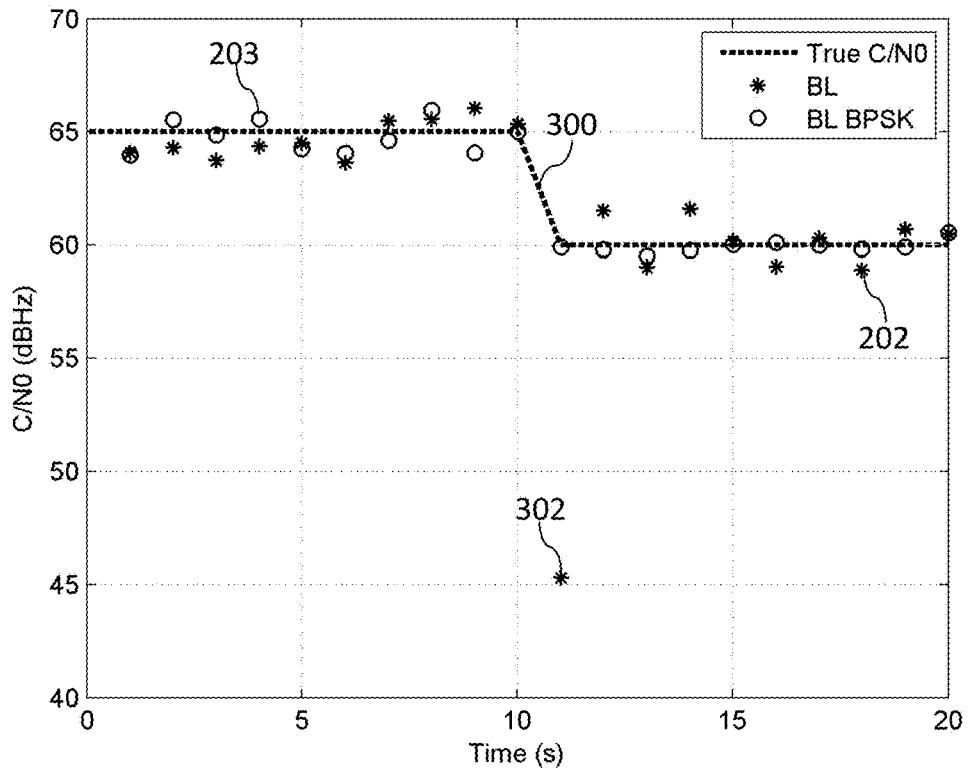
FIG. 3 shows further example simulation results of different $C/N_0$ estimation methods.

FIG. 3 shows example performance results for the BL estimator ("stars" 202) and for the BL BPSK estimator ("circles" 203) for the dynamic case, subject to an abrupt change of the true $C/N_0$ value 300. It can be seen that the BL estimator provides significant deviations 302 from the true $C/N_0$ value 300, subject to an abrupt change. On the other hand, the BL BPSK estimator provides reliable estimates 203, even for the dynamic case.

It should be noted that for very high $C/N_0$ values (e.g. for 70 dBHz or higher) and in case other GNSS signal components are present in the quadrature component (also referred to as the quadrature channel), the PRN code chips of this quadrature component may be above the noise floor. In this situation, the usage of the modified noise term $2 \cdot Q_{P,k}{}^2$ for assessing the noise power level may not be possible. In order to address this issue, several modifications of the above mentioned BL BPSK estimator are proposed. These modifications may also be used stand-alone (i.e. independent of the BL BPSK estimator).

Figure 1C:
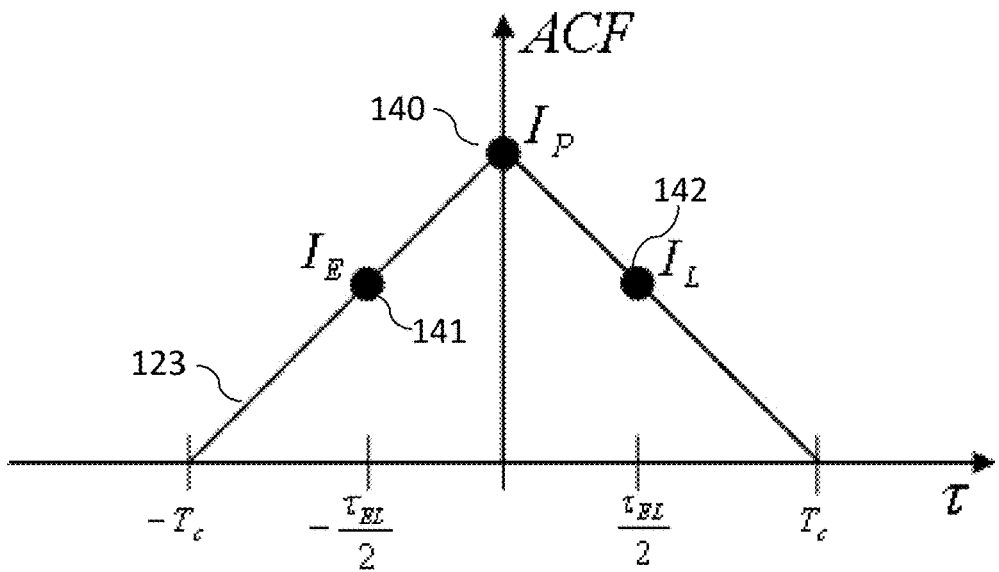

Besides the prompt correlator, the GNSS receiver typically also comprises early and late correlators that are used as inputs to the delay lock loop (DLL) discriminator. The noise power level from these correlators may also be assessed and used to provide an appropriate SNR estimator. In the following, an example is given for a BPSK signal like GPS C/A, but this approach can be applied to other modulating signals, such as BOC and BOCcos signals, as well. FIG. 1c shows the simplified autocorrelation function (ACF) 123 of the PRN code, $T_c$ denotes the duration of one PRN code chip. A correlator correlates the received modulating signal with a replica, which aims to match the PRN code of the received modulating signal. The replica may be intentionally advanced by $½\tau_{EL}$ or delayed by $½\tau_{EL}$, to yield an early replica and a late replica, respectively. After the integrate & dump, this yields the in-phase $I_P$, $I_E$ or $I_L$ correlation results 140, 141, 142, respectively, as shown in FIG. 1c, referred to as the prompt in-phase correlation, the early in-phase correlation and the late in-phase correlation, respectively. Each of these correlation results is typically corrupted with noise. It can be shown that the noise on $I_E$ and $I_L$, denoted in the following with $n_{E,k}$ and $n_{L,k}$, respectively, is correlated as follows:

$$E[n_{E,k} n_{L,k}] = \sigma_n^2 \cdot \text{ACF}(\tau_{EL})$$

wherein $\sigma_n^2$ denotes the noise power level in the in-phase component and wherein $\text{ACF}(\tau_{EL})$ denotes the value of the autocorrelation function 123 for a lag $\tau_{EL}$.

The ACF 123 of the PRN code has basically a triangular shape as shown in FIG. 1c, the maximum value is the mean value of $I_P$ 140. Therefore, the ACF 123 between $-T_c$ and $+T_c$ can be expressed as $$ACF(\tau_{EL}) = E[I_P]\left(1 - \frac{|\tau_{EL}|}{T_c}\right),$$

with $E[I_P]$ being the expectation or mean value of $I_P$.

Typically, in the GNSS receiver, the cross-correlation function (CCF) between the received modulating signal and a replica of the modulating signal is calculated, and not the actually ACF. The shape of CCF and ACF slightly differ due to the limited front-end bandwidth and sample rate. The difference in shape of the CCF and ACF could also be considered in the presently described approach, but is not discussed for the sake of simplicity. In particular, the ACF could be replaced by the CCF in the above mentioned formulas.

With the reasoning that the difference of $I_E$ and $I_L$ is dominated by the noise on both in-phase correlation values, and that the noise power level in the in-phase component (or in-phase channel), $\sigma_n^2$, is the same as in the quadrature component (or channel) and therefore half the total noise power level, and due to $$\begin{aligned}
E[(I_{E,k} - I_{L,k})^2] &= E[(n_{E,k} - n_{L,k})^2] \\
&= E[n_{E,k}^2 - 2 n_{E,k} n_{L,k} + n_{L,k}^2] \\
&= E[n_{E,k}^2] + E[n_{L,k}^2] - 2E[n_{E,k} n_{L,k}] \\
&= 2\sigma_n^2 - 2\sigma_n^2 ACF(\tau_{EL}) \\
&= 2\left(1 - E[I_P]\left(1 - \frac{\tau_{EL}}{T_c}\right)\right)\sigma_n^2
\end{aligned}$$

and $$E[I_P] = \frac{1}{N}\sum_{k=1}^{N} I_{P,k},$$

the following modified SNR estimator may be proposed:

$$SNR = \left[\frac{1}{N}\sum_{k=1}^{N} \frac{(I_{E,k} - I_{L,k})^2 / \left(1 - \frac{1}{N}\left(1 - \frac{\tau_{EL}}{T_c}\right)\sum_{k=1}^{N} I_{P,k}\right)}{I_{P,k}^2}\right]^{-1}. \quad (3)$$

In the above SNR estimator, the instantaneous signal power is estimated based on the squared prompt in-phase correlation output. The instantaneous noise power is estimated based on the squared difference of the early and late in-phase correlation outputs, normalized by the mean value of the squared difference of the early and late in-phase correlation outputs. The outputs of the prompt, early and late correlators are readily available at an GNSS receiver, thereby providing a resource efficient SNR estimator.

It is also possible to assess the noise power level from one correlator result only. Noting that the noise power level in the in-phase component may be given by $\sigma_n^2 = E[(I_P - E[I_P])^2]$, the following modified SNR estimator may be proposed:

$$SNR = \left[\frac{1}{N}\sum_{k=1}^{N} \frac{2\cdot\left(I_{P,k} - \frac{1}{N}\sum_{k=1}^{N} I_{P,k}\right)^2}{I_{P,k}^2}\right]^{-1}. \quad (4)$$

It should be noted that in order to assess the noise power level, the early or late correlators, or additional correlators if available, could be used, too. It is also possible to calculate the mean value of a correlator output from which the noise power level shall be assessed, from the mean of another correlator output and the known ACF or CCF, respectively. Additionally, the assessment of the noise power level does not need to be performed with one single correlator as shown above, several correlators may be used and an average of the observed noise power levels may be calculated.

Alternatively or in addition, the receiver may be equipped with at least one additional correlator in the in-phase channel, which may determine a correlation with a replica of the modulating signal, which is offset by more than one PRN code chip away from the prompt correlator, i.e. which may determine a correlation outside of the correlation peak or correlation triangle 123. A correlator that performs outside of the correlation peak is acting basically as a probe for the noise power level, because outside the correlation peak envelope, the ACF 123, respectively CCF, is dominated by the noise. As an example, with one additional correlator which operates more than one PRN code chip away from the prompt in-phase correlator, denoted with $I_O$, the following modified SNR estimator may be proposed:

$$SNR = \left[\frac{1}{N}\sum_{k=1}^{N} \frac{2\cdot I_{O,k}^2}{I_{P,k}^2}\right]^{-1}. \quad (5)$$

In the above SNR estimator, the squared output of the additional correlator is used as an estimate for the instantaneous noise power.

If several correlators outside the correlation peak envelope are used, the above expression may be modified accordingly. In particular, the variance of the in-phase correlation values of the plurality of correlators may be used to estimate the instantaneous noise power. It should be noted that the position of the additional correlator(s) outside the correlation peak envelope may be chosen such that the influence of multipath on the correlation result(s) is reduced (e.g. minimized). Typically, the length of even a short PRN code like GPS CA is already 300 km. Multipath delays are much smaller, therefore the probe correlator can be placed further away from the prompt correlator than a multipath signal can be delayed.

The latter SNR estimator (which uses one or more additional correlators) is particularly stable with respect to abrupt changes of the $C/N_0$ values, as the noise power level is determined using one or more dedicated correlators. In particular, the latter SNR estimator does not make use of the mean value of a correlation result to assess the noise power level. The determination of a mean value is typically sensitive to an abrupt change in the $C/N_0$ value, because the determination of the mean value may delay the impact of the abrupt change in the $C/N_0$ value.

Figure 4:
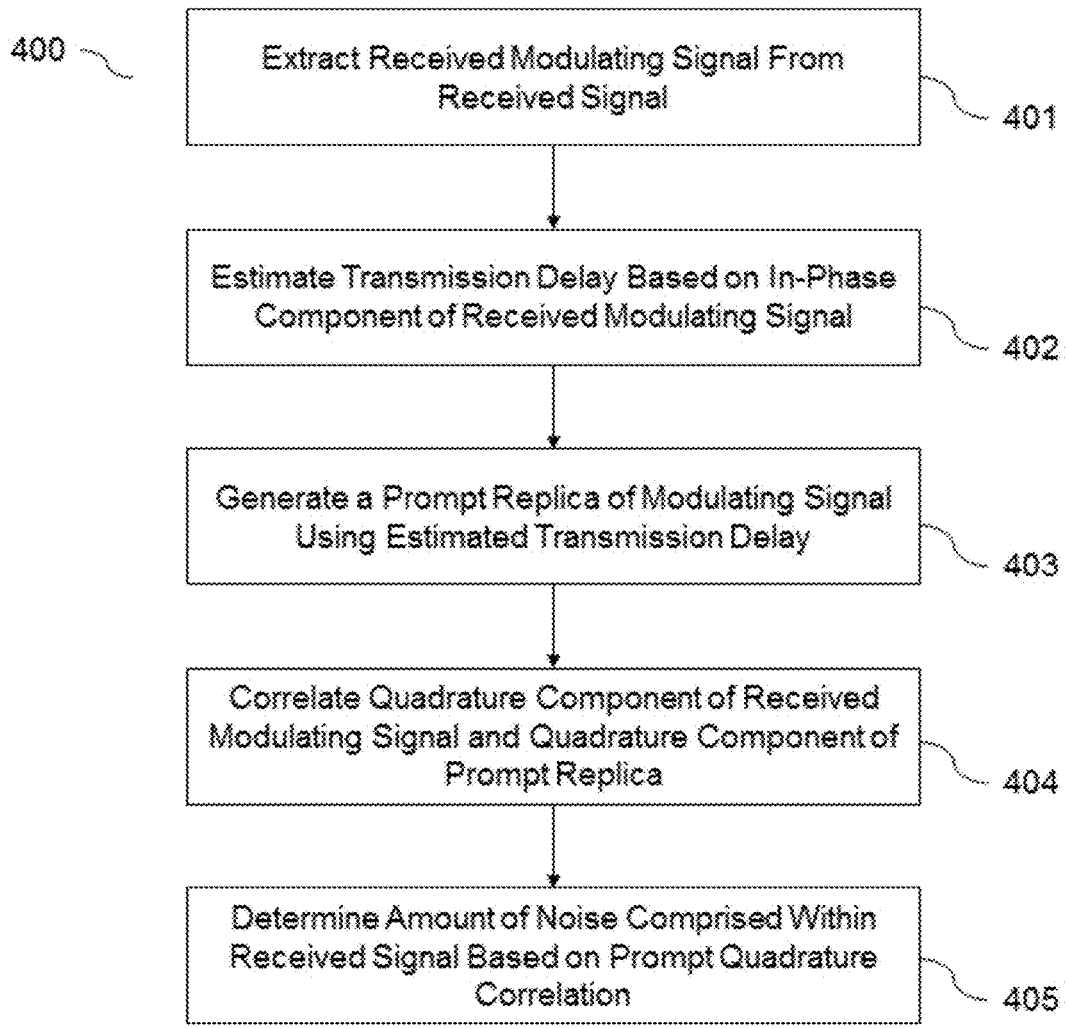
FIG. 4 shows a flow chart of an example method for estimating the Carrier-to-Noise Ratio of a satellite signal.
Figure 5:
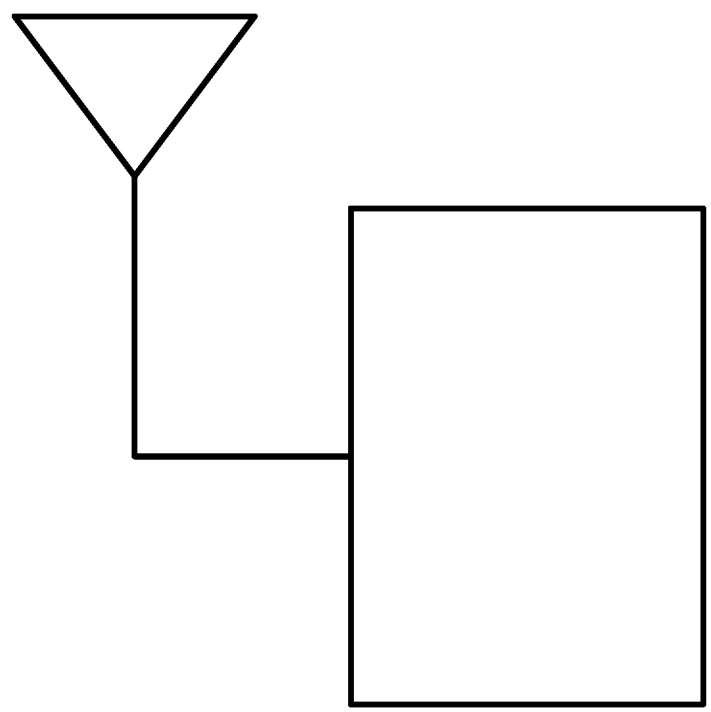
FIG. 5 depicts a GNSS receiver with an antenna configured to implement one or more aspects of the invention.

FIG. 4 shows the flow chart of an example method 400 for determining an indicator of an amount of noise comprised within a received signal within a satellite communication network or within a GNSS. The indicator may e.g. comprise an SNR value or a $C/N_0$ value. As outlined above, the received signal may be indicative of a carrier signal modulated with a modulating signal 101, wherein the modulating signal 101 comprises an in-phase component and a quadrature component. Typically, the received signal has incurred a transmission delay. The method 400 comprises extracting a received modulating signal from the received signal (step 401). This may be achieved by compensating the frequency and/or phase of the carrier signal. Furthermore, an estimate of the transmission delay is determined based on the in-phase component of the received modulating signal (step 402). In particular, the estimate of the transmission delay may be determined without considering the quadrature components of the received modulating signal. In addition, a prompt replica of the modulating signal 101 is generated using the estimate of the transmission delay (step 403). Next, a correlation, referred to as a prompt quadrature correlation, of the quadrature component of the received modulating signal and of the quadrature component of the prompt replica is determined (step 404). Finally, the indicator of the amount of noise comprised within the received signal may be determined based on the prompt quadrature correlation (e.g. using formula (2)) (step 405).

The present application also describes a corresponding system or device that is configured to determine an indicator of an amount of noise comprised within a received signal. The corresponding system or device comprises a reception unit configured to receive a signal, referred to as the received signal, which has incurred a transmission delay. The received signal is indicative of a carrier signal modulated with a modulating signal 101. The modulating signal 101 typically comprises an in-phase component and a quadrature component. Furthermore, the system or device comprises a signal processing unit configured to extract a received modulating signal from the received signal, and configured to determine an estimate of the transmission delay based on the in-phase component of the received modulating signal. The signal processing unit may further be configured to generate a prompt replica of the modulating signal 101 using the estimate of the transmission delay, and configured to determine a correlation, referred to as a prompt quadrature correlation, of the quadrature component of the received modulating signal and of the quadrature component of the prompt replica. In addition, the system or device may comprise an indicator unit configured to determine an indicator of the amount of noise comprised within the received signal based on the prompt quadrature correlation.

In summary, the SNR estimators described in the present document allow for a reliable SNR and $C/N_0$ estimation also at $C/N_0$ values exceeding 50 dBHz, where most conventional methods fail. Furthermore, the proposed methods do not produce outliers of the SNR and $C/N_0$ estimates in case the true $C/N_0$ changes abruptly. This is illustrated in FIG. 3, which shows a true C/N0 profile 300 according to which IQ data was generated. Furthermore, FIG. 3 shows the $C/N_0$ estimates 202, 302 produced by the BL estimator, and the $C/N_0$ estimates 203 produced by the BL BPSK estimator. For both estimators, N=100 IQ data samples were considered for each SNR estimate, the pre-detection integration time was set to 10 ms such that every second, one independent SNR estimate could be produced. The outlier 302 produced by the BL estimator is clearly visible at t=10 s, whereas the proposed BL BPSK estimator does not show this outlier.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Especially, different types of discriminators may be used, e.g. double delta, dot product, etc., which may or may not require the generation of additional replica signals and the calculation of correlations in a way which is known to a person skilled in the art. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A method for determining an indicator of an amount of noise comprised within a received signal of a plurality of received satellite signals received by a Global Navigation Satellite System (GNSS) receiver, the method comprising
    extracting, by the GNSS receiver, a received modulating signal from the received signal, wherein the received signal has incurred a transmission delay, wherein the received signal is indicative of a carrier signal modulated with a modulating signal, and wherein the modulating signal comprises an in-phase component and a quadrature component;
    determining, by the GNSS receiver, an estimate of the transmission delay based on an in-phase component of the received modulating signal;
    generating, by the GNSS receiver, a prompt replica of the modulating signal using the estimate of the transmission delay;
    determining, by the GNSS receiver, a prompt quadrature correlation of a quadrature component of the received modulating signal and of a quadrature component of the prompt replica;
    determining, by the GNSS receiver, the indicator of the amount of noise comprised within the received signal based on the prompt quadrature correlation; and
    selecting, by the GNSS receiver, a subset of the plurality of received satellite signals based at least in part on the indicator.

2. The method of claim 1, further comprising:
    determining, by the GNSS receiver, a prompt in-phase correlation of the in-phase component of the received modulating signal and an in-phase component of the prompt replica; and
    determining, by the GNSS receiver, the indicator of the amount of noise comprised within the received signal based on a ratio of a value derived from the prompt in-phase correlation and a value derived from the prompt quadrature correlation.

3. The method of claim 2, wherein:
    $I_P$ is the prompt in-phase correlation;
    $Q_P$ is the prompt quadrature correlation;
    a first signal-to-noise ratio is determined as $$SNR = \left[\frac{1}{N}\sum_{k=1}^{N}\frac{2\cdot Q_{P,k}^2}{I_{P,k}^2}\right]^{-1},$$

with k identifying a sample of the prompt in-phase and quadrature correlations and with N being an integer greater than one; and the indicator of the amount of noise comprised within the received signal is determined based on the first signal-to-noise ratio or a scaled value of the first signal-to-noise ratio.

4. The method of claim 3, wherein:

the indicator of the amount of noise comprised within the received signal is a carrier-to-noise ratio; and the carrier-to-noise ratio is determined by multiplying the first signal-to-noise ratio with an equivalent noise bandwidth.

5. The method of claim 2, wherein determining, by the GNSS receiver, the indicator of the amount of noise comprised within the received signal comprises:

determining a mean value of the prompt in-phase correlation; and determining the indicator of the amount of noise comprised within the received signal based on a difference of the prompt in-phase correlation and a mean value of the prompt in-phase correlation.

6. The method of claim 5, further comprising:

determining a third signal-to-noise ratio based on a ratio of a squared difference of the prompt in-phase correlation, the mean value of the prompt in-phase correlation, and a squared prompt in-phase correlation; and determining the indicator of the amount of noise comprised within the received signal based on the third signal-to-noise ratio.

7. The method of claim 1, wherein determining, by the GNSS receiver, the indicator of the amount of noise comprised within the received signal comprises:

generating an early replica of the modulating signal using the estimate of the transmission delay and using an early gate time offset;

determining an early in-phase correlation of the in-phase component of the received modulating signal and an in-phase component of the early replica;

generating a late replica of the modulating signal using the estimate of the transmission delay and a late gate time offset;

determining a late in-phase correlation of the in-phase component of the received modulating signal and an in-phase component of the late replica; and determining the indicator of the amount of noise comprised within the received signal based on a difference of the early in-phase correlation and the late in-phase correlation.

8. The method of claim 7, further comprising:

determining a mean value of a squared difference of the early in-phase correlation and the late in-phase correlation; and determining the indicator of the amount of noise comprised within the received signal based on the squared difference of the early in-phase correlation and the late in-phase correlation, normalized by a mean value of the squared difference of the early in-phase correlation and the late in-phase correlation.

9. The method of claim 8, further comprising:

determining a prompt in-phase correlation of the in-phase component of the received modulating signal and an in-phase component of the prompt replica;

determining the indicator of the amount of noise comprised within the received signal based on a ratio of a value derived from the prompt in-phase correlation and a value derived from the prompt quadrature correlation;

determining a second signal-to-noise ratio based on a ratio of a squared difference of the early in-phase correlation and the late in-phase correlation, normalized by a mean value of a squared difference of the early in-phase correlation and the late in-phase correlation, and of a squared prompt in-phase correlation; and determining the indicator of the amount of noise comprised within the received signal based on the second signal-to-noise ratio.

10. The method of claim 1, wherein determining, by the GNSS receiver, the indicator of the amount of noise comprised within the received signal comprises:

generating an offset replica of the modulating signal using the estimate of the transmission delay and using a decorrelating time offset, wherein an autocorrelation value of the modulating signal for a lag corresponding to the decorrelating time offset is below a pre-determined autocorrelation threshold;

determining an offset in-phase correlation of the in-phase component of the received modulating signal and an in-phase component of the offset replica; and determining the indicator of the amount of noise comprised within the received signal based on the offset in-phase correlation.

11. The method of claim 10, wherein:

the modulating signal is indicative of a code signal;

the code signal has a pre-determined symbol duration $T_c$; and the decorrelating time offset is equal to or greater than the pre-determined symbol duration $T_c$.

12. The method of claim 1, wherein the modulating signal comprises a BPSK signal or a binary offset carrier signal.

13. The method of claim 1, wherein extracting, by the GNSS receiver, the received modulating signal from the received signal comprises estimating, by the GNSS receiver, a phase or a frequency of the carrier signal.

14. The method of claim 1, wherein determining, by the GNSS receiver, a correlation of a component of the received modulating signal and a component of a replica of the modulating signal comprises multiplying, by the GNSS receiver, corresponding samples of the component of the received modulating signal and of the component of the replica.

15. A Global Navigation Satellite System (GNSS) receiver, wherein the receiver is configured to:

receive a plurality of received satellite signals, including a received signal having incurred a transmission delay, wherein the received signal is indicative of a carrier signal modulated with a modulating signal, wherein the modulating signal comprises an in-phase component and a quadrature component;

extract a received modulating signal from the received signal;

determine an estimate of the transmission delay based on an in-phase component of the received modulating signal;

generate a prompt replica of the modulating signal using the estimate of the transmission delay;

determine a prompt quadrature correlation of a quadrature component of the received modulating signal and of a quadrature component of the prompt replica; and determine an indicator of an amount of noise comprised within the received signal based on the prompt quadrature correlation;

select a subset of the plurality of received satellite signals based at least in part on the indicator.

\* \* \* \* \*